(12) United States Patent
Zien

(10) Patent No.: US 9,103,683 B2
(45) Date of Patent: Aug. 11, 2015

(54) AZIMUTH UPDATE CONTROLLER FOR INERTIAL SYSTEMS

(71) Applicant: Linn Zien, Westlake Village, CA (US)

(72) Inventor: Linn Zien, Westlake Village, CA (US)

(73) Assignee: NORTHROP GRUMMAN GUIDANCE AND ELECTRONICS COMPANY, INC., Woodland Hills, CA (US)

(*) Notice: Subject to any disclaimer, the term of this patent is extended or adjusted under 35 U.S.C. 154(b) by 149 days.

(21) Appl. No.: 13/897,945

(22) Filed: May 20, 2013

(65) Prior Publication Data

US 2014/0343844 A1   Nov. 20, 2014

(51) Int. Cl.
*G01C 21/10* (2006.01)
*G01C 25/00* (2006.01)
*G01C 21/16* (2006.01)
*G01C 21/18* (2006.01)

(52) U.S. Cl.
CPC .............. *G01C 25/005* (2013.01); *G01C 21/16* (2013.01); *G01C 21/165* (2013.01); *G01C 21/18* (2013.01)

(58) Field of Classification Search
USPC .................... 701/470, 500, 505; 702/92, 141
See application file for complete search history.

(56) References Cited

U.S. PATENT DOCUMENTS

| 4,812,977 | A   | * | 3/1989  | Hulsing, II ........................ 702/6 |
| 6,477,465 | B1  | * | 11/2002 | McCall et al. ................ 701/501 |
| 6,577,952 | B2  |   | 6/2003  | Geier et al. |
| 6,826,478 | B2  | * | 11/2004 | Riewe et al. .................. 701/470 |
| 8,005,635 | B2  |   | 8/2011  | Lin |
| 2009/0089001 | A1 | * | 4/2009  | Lin ................................ 702/92 |
| 2009/0326740 | A1 | * | 12/2009 | Wang ................................ 701/3 |
| 2010/0019963 | A1 | * | 1/2010  | Gao et al. ................. 342/357.04 |
| 2012/0245850 | A1 | * | 9/2012  | Bang et al. ........................ 702/9 |

* cited by examiner

*Primary Examiner* — Tuan C. To
*Assistant Examiner* — Issac Smith
(74) *Attorney, Agent, or Firm* — Tarolli, Sundheim, Covell & Tummino LLP

(57) ABSTRACT

In one embodiment, a system includes a motion detector to determine a motion event or a no motion event for an inertial system. The determination of the events is based upon comparing at least one motion parameter in the inertial system to at least one predetermined threshold. An azimuth update controller (AUC) periodically requests motion detection events from the motion detector and corrects heading information to a previous positional state in the inertial system in response to receipt of the no motion event.

19 Claims, 6 Drawing Sheets

AZIMUTH UPDATE CONTROLLER FOR INERTIAL SYSTEMS

TECHNICAL FIELD

The present invention relates generally to inertial systems, and more particularly to a system and method for correcting heading information in an inertial system.

BACKGROUND

An inertial navigation system (INS) includes at least a computer and a platform or module containing accelerometers, gyroscopes, and/or other motion-sensing devices. The INS is initially provided with its position and velocity from another source (a human operator, a GPS satellite receiver, and so forth), and thereafter computes its own updated position and velocity by integrating information received from the motion sensors. The advantage of an INS is that it requires no external references in order to determine its position, orientation, or velocity once it has been initialized. Thus, the INS can detect a change in its geographic position (a move east or north, for example), a change in its velocity (speed and direction of movement), and a change in its orientation (rotation about an axis). It achieves this by measuring the linear and angular accelerations applied to the system. Since it requires no external reference (after initialization), it is immune to jamming and deception.

While the INS is stationary, some ground based platforms (e.g., Radar and Forward Looking Infrared applications) need an accurate pointing solution from the inertial system since the target location is determined by using the range measurement received from Radar and the pointing solution (or heading) from the Inertial system. From the Target Location Error (TLE) point of view however, the pointing error is typically the dominant error source, contributing to about 70-80% of the total error budget for pointing solution accuracy. The solution or heading accuracy requirement for example, is usually 1 mil at 65 degree latitude, for example. In many instances, the stationary environment for the inertial system can last over days, weeks, or even months which can pose problems for determining accurate headings. Without the benefit of platform rotations for example, the inertial system heading tends to drift over time, resulting in system pointing performance degradation. In addition, the heading could exhibit erratic, out-of-tolerance excursions over the first 15-50 hours for long durations, for example (4-5 hours). An obvious solution is to improve the gyro performance such that the system heading can meet the required performance. This approach is expensive in both cost and time.

SUMMARY

In an aspect of the invention, a system is provided. The system includes a motion detector to determine a motion event or a no motion event for an inertial system. The determination of the events is based upon comparing at least one motion parameter in the inertial system to at least one predetermined threshold. An azimuth update controller (AUC) periodically requests motion detection events from the motion detector and corrects heading information to a previous positional state in the inertial system in response to receipt of the no motion event.

In another aspect of the invention, a method includes detecting a motion event or a no motion event for an inertial system. The determination of the events is based upon comparing at least one motion parameter in the inertial system to at least one predetermined threshold. The method includes processing the at least one motion parameter to determine if heading errors are detected in the inertial system. The method includes correcting heading information in the inertial system to a previous positional state in response the no motion event and if the heading errors are detected.

In yet another aspect of the invention, a non-transitory computer readable medium storing machine readable instructions can be configured to determine a motion event or a no motion event for an inertial system. The determination of the events is based upon comparing at least one motion parameter in the inertial system to at least one predetermined threshold. The instructions can also be configured to correct heading information to a previous positional state in the inertial system in response to receipt of the no motion event and if heading errors are detected.

DETAILED DESCRIPTION

Systems and methods are provided for correcting heading information in an inertial system. In one aspect, an azimuth update controller (AUC) is provided that receives input data from various components such as velocity data, accelerometer data, GPS data, and gyro data, for example. From such inputs, the AUC determines heading correction information for the inertial system by periodically analyzing the input data against a last known accurate heading. For example, after each 30 minute interval, the AUC can compute whether or not physical motion or other environmental changes (e.g., temperature) have occurred. If no motion or other change was detected, (e.g., if a velocity value was detected but no associated platform motion of the inertial system was also detected), then the AUC can determine that an error has occurred in the heading from the previous time period reading and initiate an automatic correction (e.g., via algorithmic data adjustment) to adjust the heading. Such heading corrections can be initiated via a Kalman filter in one example operating in the AUC. Additionally, a motion detector operating in the AUC can employ a multi-input Kalman filter to determine whether or not motion was detected (e.g., a motion or no motion event) due to inertial system platform movements and/or due to heading errors caused by drift, for example. Based on such determinations by the motion detector, the AUC can determine whether or not to adjust the heading information in the inertial system. In another aspect, the AUC can be initiated after an initial inactive period to allow the inertial system to stabilize before implementing automatic correction changes to the inertial system.

Figure 1:
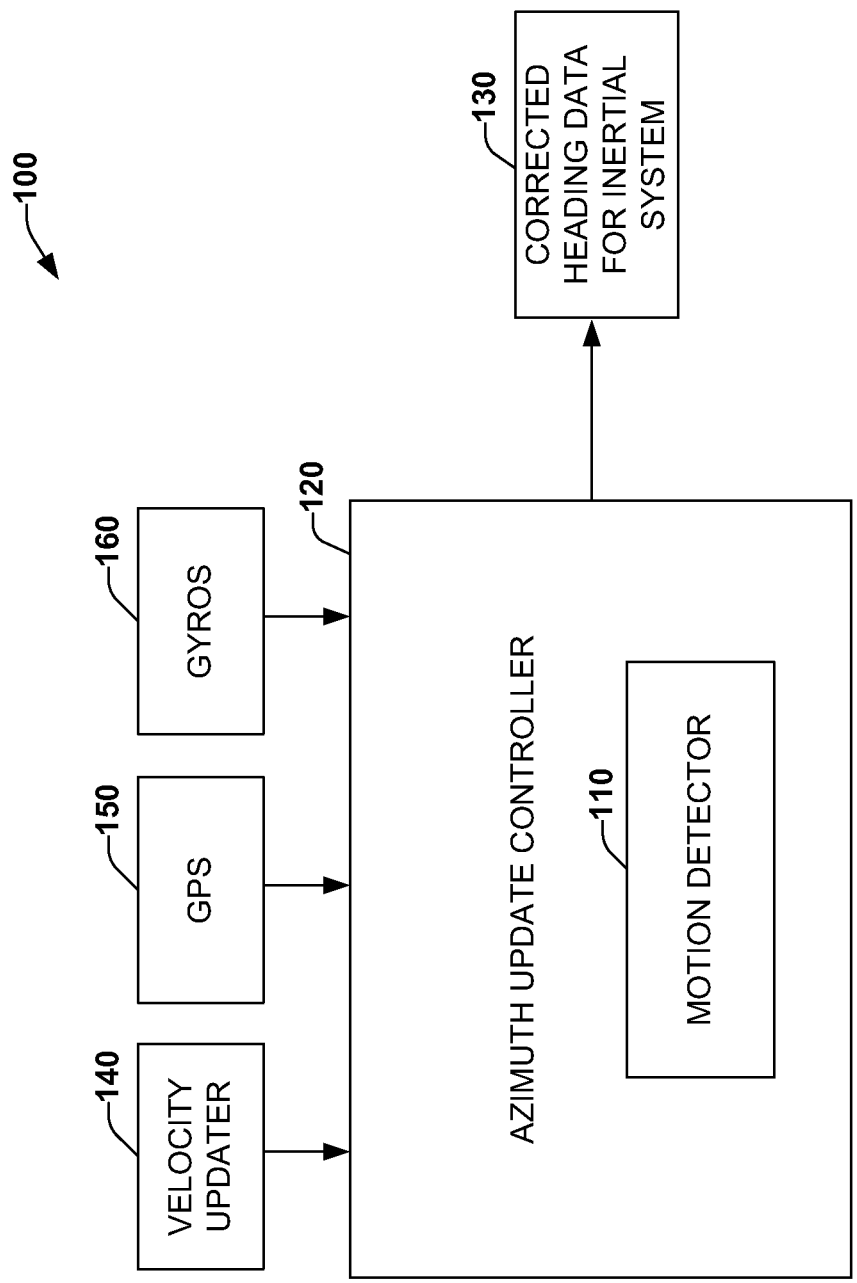
FIG. 1 illustrates a schematic block diagram of a system for automatically adjusting heading information for an inertial system in accordance with an aspect of the present invention.

FIG. 1 illustrates a system 100 for automatically adjusting heading information for an inertial system in accordance with an aspect of the present invention. The system 100 includes a motion detector to determine a motion event or a no motion event for an inertial system (See inertial system e.g., FIG. 2). The determination of the events is based upon comparing at least one motion parameter (e.g., vertical earth rate, gyro bias) in the inertial system to at least one predetermined threshold. For example, the inertial system can provide heading information (e.g., 3-D positional coordinates) and can be employed with a Radar system to provide range information for a mission computer to locate a target at both the correct range and location. An azimuth update controller (AUC) 120 receives the motion event data from the motion detector 110 and periodically corrects the heading information at 130 to a previous positional state in the inertial system if the no motion event was detected and if an error such as gyro instrument error data was detected. The AUC 120 and motion detector receive various inputs to determine whether or not to correct the heading information at 130. These inputs can include data from a velocity updater 140 (e.g., Zero Velocity Updating (ZUPT) component)), data from a global position system (GPS) 150, and data from gyros 160 which can include an X gyro, a Y gyro, and a Z gyro to facilitate determination of three-dimensional coordinates. Other inputs, although not shown, can include accelerometer inputs for computing leveling errors, for example.

From the various inputs 140, 150, and 160, the AUC 120 can determine heading correction data 130 for the inertial system by periodically analyzing the input data against a last known accurate heading. For example, after each 30 minute interval of time (or other predetermined amount of time), the AUC 120 can compute whether or not physical motion or other environmental changes (e.g., temperature) have occurred. If a no motion event (e.g., no platform movement detected) or other change was detected by the motion detector 110, (e.g., if a velocity value was detected but no associated platform motion of the inertial system was also detected), then the AUC 120 can determine that an error has occurred in the heading from the previous time period reading and initiate an automatic correction at 130 (e.g., via algorithmic data adjustment) to adjust the heading. Such heading corrections can be initiated via a Kalman filter in one example operating in the AUC 120. The motion detector 110 operating in (or in conjunction with) the AUC 120 can employ a multi-input Kalman filter (e.g., 4 state input) to determine whether or not motion was detected due to inertial system platform movements and/or due to heading errors caused by drift, for example.

Based on such determinations by the motion detector 110, the AUC 120 can determine whether or not to adjust the heading information in the inertial system. In another aspect, the AUC 120 can be initiated after an initial inactive period (e.g., 5 hours or other time period) to allow the inertial system to stabilize before implementing automatic correction changes at 130 to the inertial system. As used herein, automatic correction refers to changes made to data values by a processor operating computer-readable instructions. For example, after a heading error is determined by the AUC 120, then a corrected heading value can be sent to the inertial system at 130 by the AUC via a Kalman filter output, for example, which is controlled by a processor and instructions operating the AUC. Such corrected heading data 130 can be the heading data received at the last known correct state of the inertial system, for example (e.g., from a previous time period where no errors were detected).

It has been determined through modeling that one of the major sources of error in the system 100 is related to the gyros 160. In particular, the error can be related gyro bias turn-on transient and instability. The motion detector 110 and AUC 120 are provided to correct for this and other effects. In one example, the AUC 120 can be an algorithm, which has been implemented in computer-readable instructions. In another example, the AUC could be a discrete processor/firmware implementation or manufactured as an integrated circuit configuration in silicon.

In one example, the AUC 120 can be activated after approximately 5 hours (or other stabilization period) from system turn-on to allow the heading data in the inertial system to stabilize. After stabilization, the AUC 120 attempts to detect any movement in azimuth angle in last 30 minutes or other time period via the motion detector 110. Thus, the inertial system should be stationary as indicated by the motion detector 110 (e.g., compare Kalman filter inputs in the motion detector to predetermined thresholds as described below). The AUC 120 should have some assurance by the motion detector 110 that the azimuth angle change is not due to the physical movement of the inertial system, for example. After observing data over last 30 minutes (or other time period, various conditions should be met.

A first condition includes "No Motion" event based on the motion detector comparing inputs to a predetermined threshold. Another condition monitored by the AUC 120 includes detecting small pitch & roll changes in one second (or other time period) (e.g., <20 μradians). Yet another condition monitored by the AUC 120 includes monitoring that temperature changes in last 30 minutes (or other time period has minimal effect. Examples of desirable limits include:

1. Small temperature changes (<1° C.) over last 30 minutes.
2. Small pitch & roll changes in 30 minutes (<20 μradians).

If the above conditions are met, the AUC 120 can utilize a Kalman filter mechanization (or other filter method) to minimize the heading change from the heading angle from 30 minutes ago (or other predetermined time period). The Kalman measurement noise model can use a $1/16$ milli-radian parameter to provide suitable results. The AUC 120 operates in conjunction with the velocity updater 140 (e.g., ZUPT (Zero Velocity Updating) and GPS 150 updating concurrently. In general, the velocity updater 140 establishes a suitable initial heading estimate for the inertial system, whereas the AUC 120, velocity updater, and GPS 150 control the heading data at 130 for the rest of system 100 operation (e.g., after initial system stabilization).

Figure 2:
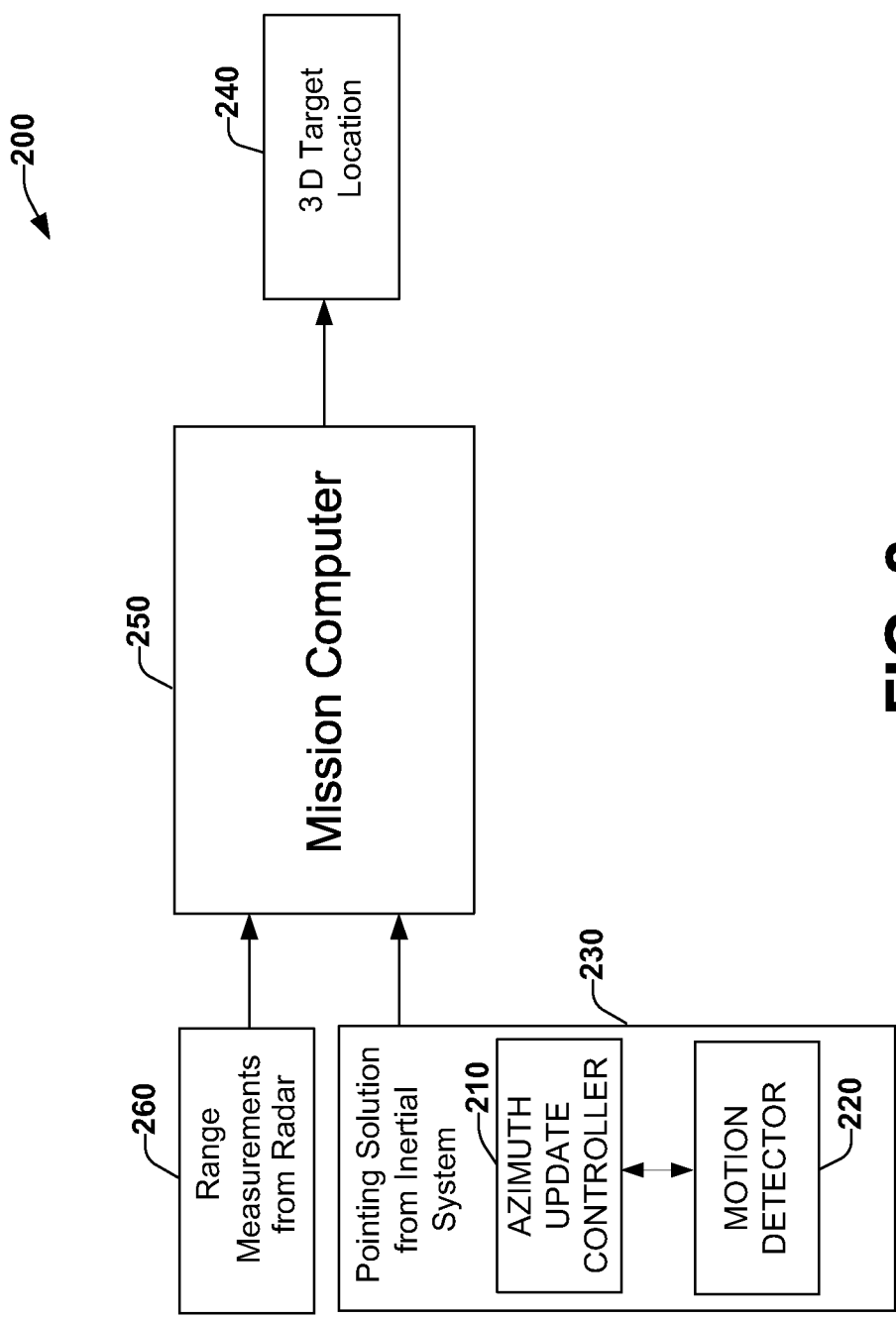
FIG. 2 illustrates an example target location system that employs an azimuth update controller (AUC) and motion detector in an inertial pointing system in accordance with an aspect of the present invention.

FIG. 2 illustrates an example target location system 200 that employs an azimuth update controller (AUC) 210 and motion detector 220 in an inertial pointing system 230. While stationary, some ground based platforms (e.g., Radar and forward looking infrared (FLIR) applications) need an accurate pointing solution from the inertial system 230 since a 3D target location 240 is determined via a mission computer 250 by using the range measurement from Radar 260 and pointing solution from the inertial system 230. From the Target Location Error (TLE) point of view, the pointing error is generally the dominant error source, contributing to about 70-80% of the total error budget. The heading accuracy requirement is typically specified at 1 mil at 65 degree latitude, for example. The stationary environment for the system 200 can last over days, weeks, or even months. Without the benefit of platform rotations, the inertial system 230 heading tends to drift over time, resulting in pointing performance degradation.

Figure 3:
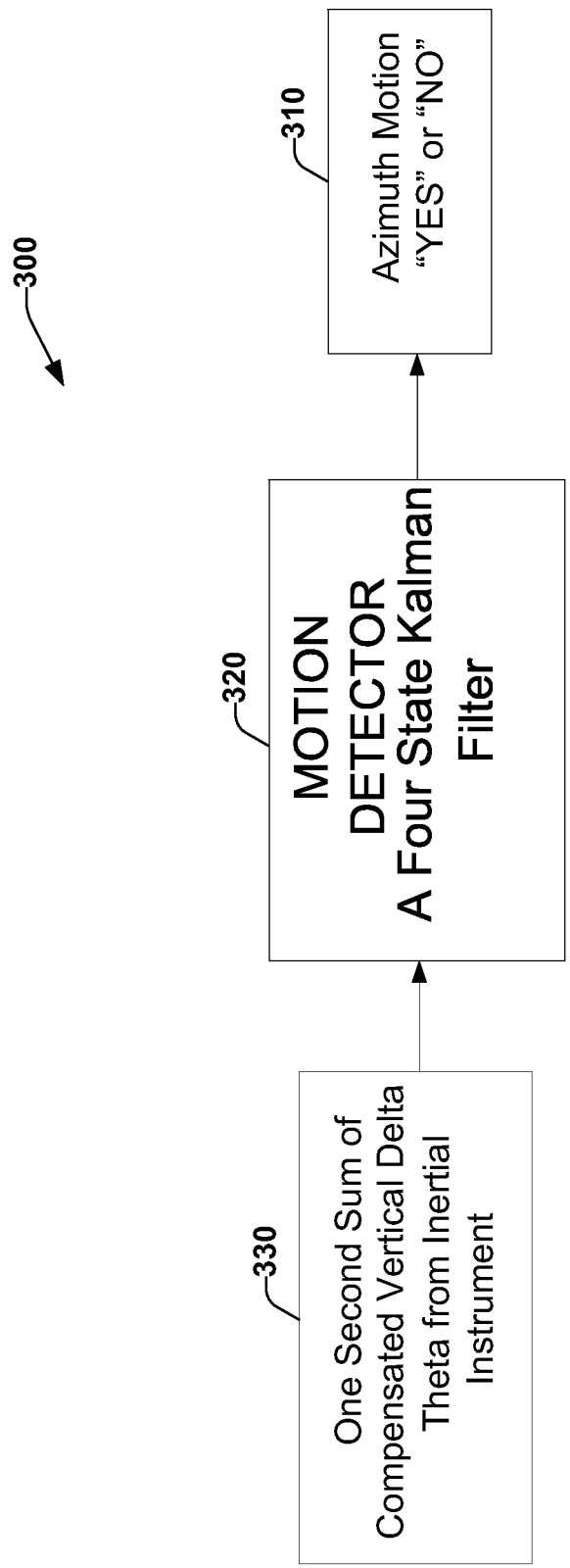
FIG. 3 illustrates an example motion detector system that can be employed with an azimuth update controller (AUC) to correct heading information in an inertial system in accordance with an aspect of the present invention.

By employing the azimuth update controller 210 and motion detector 220, the systems and methods described herein can provide at least 50% improvement in static heading performance over current systems. As noted previously, the AUC 210 can be started after an initial stabilization period (e.g., 5 hours). Then, after periodic intervals (e.g., every 30 minutes), the motion detector 220 can be run to determine if any platform movements occurred and/or if errors were detected via instrumentation. If no platform movement was detected by the motion detector 210, and there were still velocity values recorded, then the error can be corrected by the AUC 210. FIG. 3 provides an expanded view of the motion detector 220.

FIG. 3 illustrates an example motion detector system 300 that can be employed with an azimuth update controller (AUC) (shown in FIGS. 1 and 2) to correct heading information in an inertial system. The function of the motion detector 300 is to detect azimuth motion in an inertial system. As shown at 310, output from a motion detector 320 includes a binary status of whether or not motion was detected (e.g., 1=YES, 0=no). The motion detector 320 can include a four-state Kalman filter, for example, that receives at its input a collected sum (e.g., one second's worth of sampled data) of vertical-delta-theta measurements 330 that are received from system gyros.

A function of the motion detector 320 is to detect physical movement in azimuth angle in the last 30 minutes (or other predetermined time period) when the environment can change due to a vehicle moving, wind gusts, animal bumps, or temperature changes, for example. The motion detector 320 can be composed of a Kalman filter with four states that include an Integral of azimuth angle, an Azimuth angle, a Vertical earth rate, and Correlated gyro bias, for example. The one second sum of compensated vertical-delta-theta at 330 can be used as the input to the filter and motion detector 320.

At the end of 30 minutes, for example, the Kalman filter in the motion detector 320 can estimate the starting values of the four states, which provide the best fit for the 30 minutes of collected gyro data. These four states can be used to predict the inertial error of azimuth integral at each of 1800 points (or other sampling interval). The difference of azimuth integral between this inertial model and the actual data is formed and can yield 1800 residuals (or other range) over the interval. These residuals represent the portion of motion that does not fit an inertial model characteristic.

The residual low frequency portion (1800 second period), and referred to as the parameter MD_Sq, is best suited for detection of very slow, small azimuth movement. The sudden movements are best detected by using the maximum from the residuals, referred to as the parameter Max Res. Detection limits for whether or not "No Motion" is indicated at 310 can be defined by the following predetermined threshold examples: (e.g., if all parameter values are less than example thresholds, then no motion flag set at 310):

1. Max_Res<0.006 rad-sec
2. MD_Sq<0.002 rad-sec
3. Max Vertical Earth rate<16 deg/hr
4. Max_Correlated Gyro Bias<0.001 deg/hr It is noted that the response from the gyros can be measured to detect whether or not platform movements have occurred and whether or not instrument errors have been introduced. For example, gyro bias error is typically sensed by the motion detector as a "smooth" response and platform movement is typically detected as a "jerky" response. Such responses can be analyzed at the output of the Kalman filter and compared to predetermined response profiles, for example, to determine platform and/or instrumentation errors.

Figure 4:
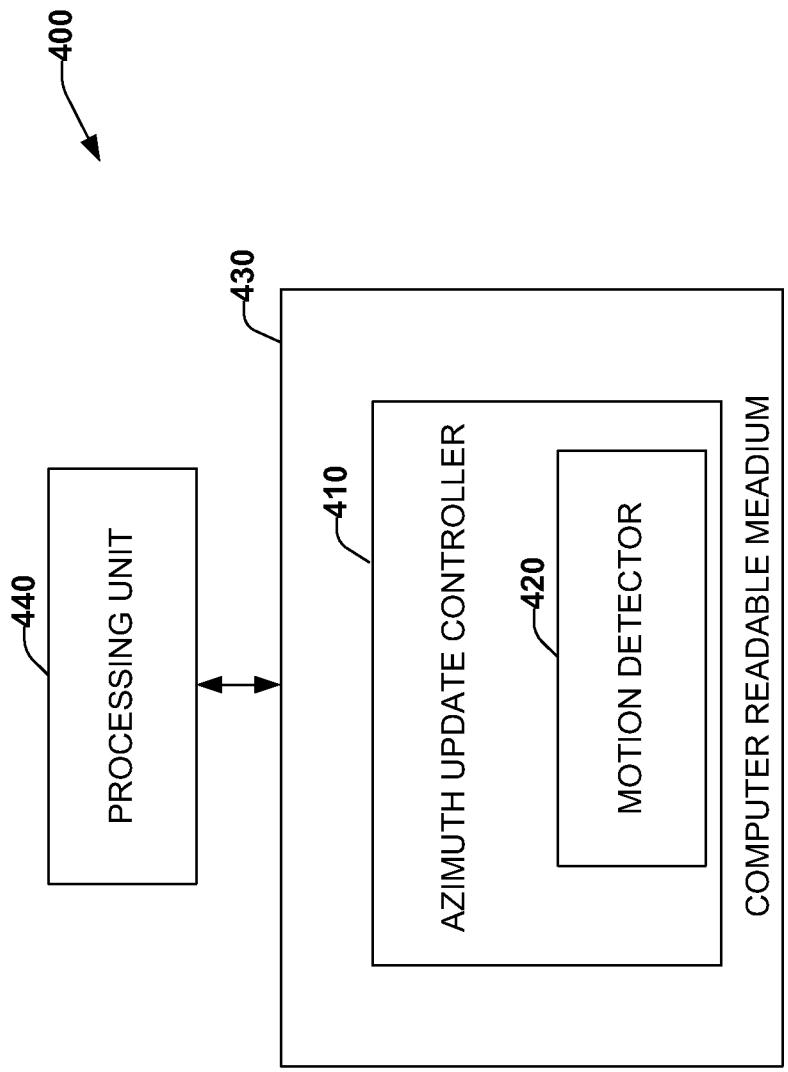
FIG. 4 illustrates an example processing environment for an azimuth update controller (AUC) and motion detector in accordance with an aspect of the present invention.

FIG. 4 illustrates an example processing environment for an azimuth update controller 410 (AUC) and motion detector 420. A memory 430 could be implemented, for example, as a non-transitory computer readable medium, such as volatile memory (e.g., random access memory), nonvolatile memory (e.g., a hard disk drive, a solid-state drive, flash memory or the like) or a combination thereof. The system 400 can also include a processing unit 440 that can access the memory 430 and execute the machine readable instructions that in one example provide the functionality for the AUC 410 and motion detector 420. The processing unit 440 can include, for example, one or more processor cores. In one example, the non-transitory computer readable medium storing machine readable instructions can be configured to determine platform movement data or instrument error data for an inertial system. The instructions can receive the platform movement data or the instrument error data from the motion detector and periodically correct heading information to a previous positional state in an inertial system if the instrument error data was detected. The instructions can determine platform movement data or instrument error data for an inertial system can include executing a four-input Kalman filter to detect motion in an inertial system. The four-input Kalman filter to detect motion in an inertial system can also include analyzing an Integral of azimuth angle, an azimuth angle, a vertical earth rate, and a correlated gyro bias over a predetermined period of time, for example.

Figure 5:
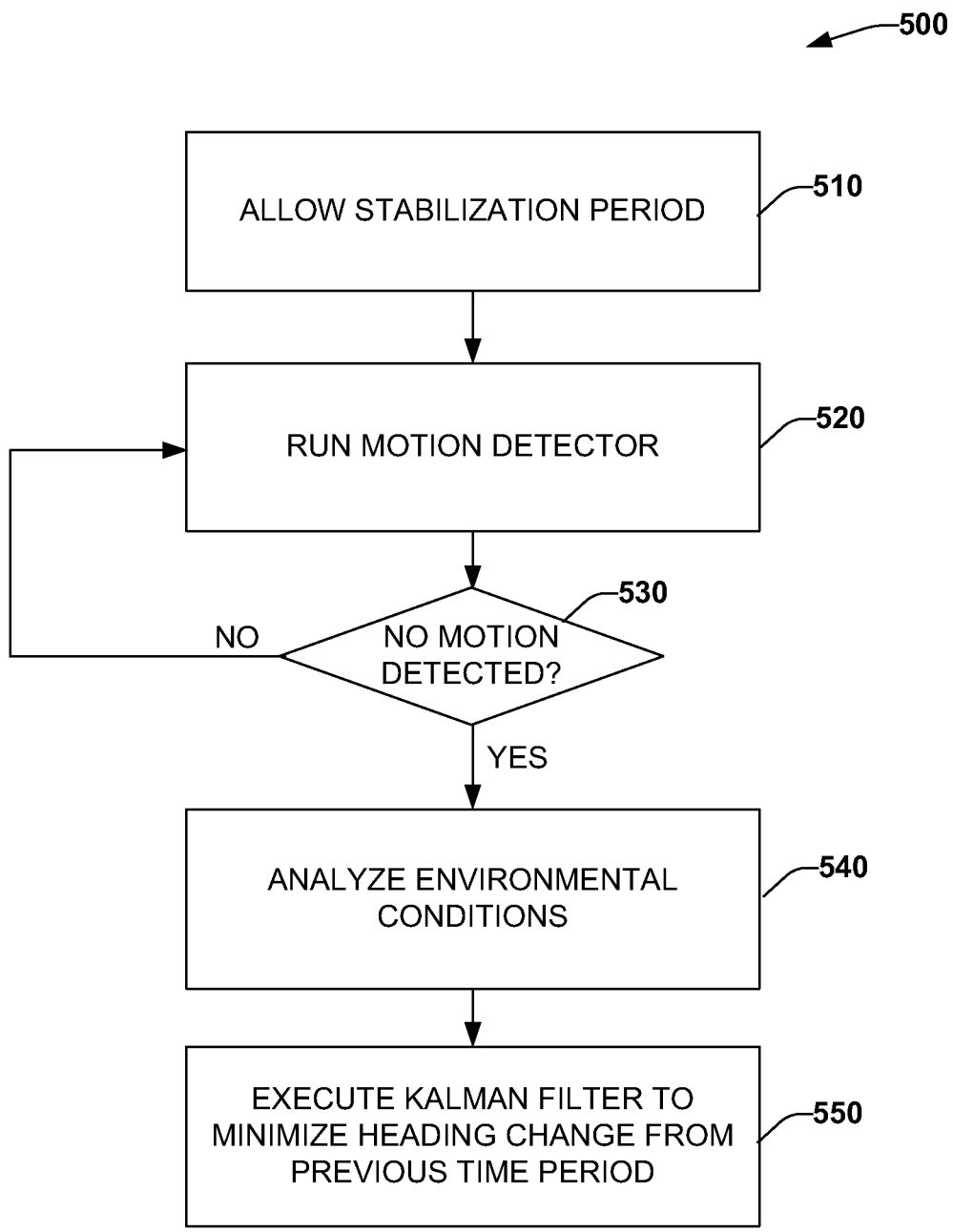
FIG. 5 illustrates an example method for correcting headings in an inertial system in accordance with an aspect of the present invention.
Figure 6:
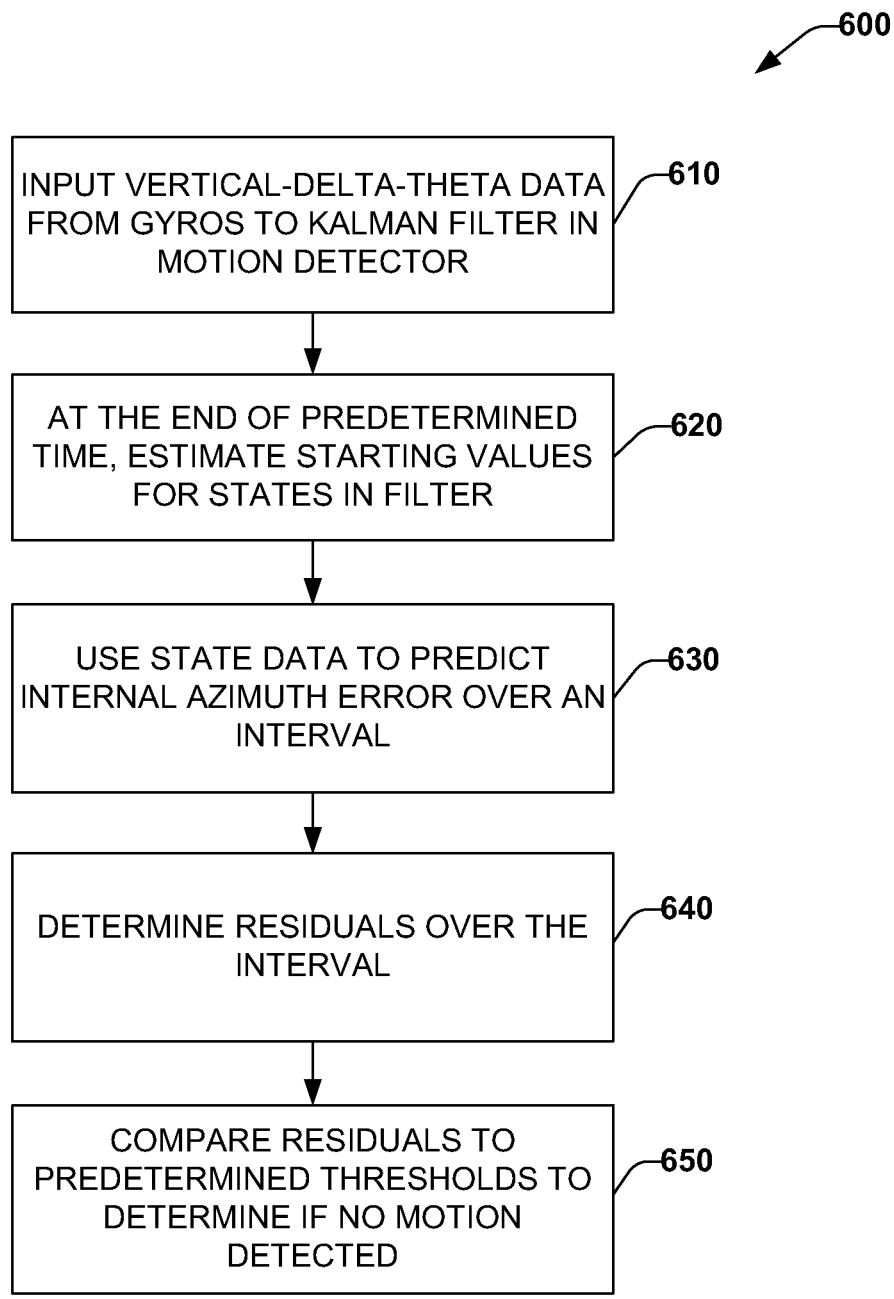
FIG. 6 illustrates an example method for detecting motion in an inertial system in accordance with an aspect of the present invention.

In view of the foregoing structural and functional features described above, methodologies in accordance with various aspects of the present invention will be better appreciated with reference to FIGS. 5 and 6. While, for purposes of simplicity of explanation, the methodologies of FIGS. 5 and 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 5 illustrates an example method 500 for correcting headings in an inertial system in accordance with an aspect of the present invention. The method 500 can be executed via an azimuth update controller described in FIG. 1, for example. At 510, a stabilization period can be provided for an azimuth update. In one example, the stabilization period can be activated after approximately 5 hours (or other stabilization period) from system turn-on to allow heading data in an inertial system to stabilize. After stabilization at 510, a motion detector is executed at 520. This can include detecting any movement in azimuth angle in last 30 minutes (or other predetermined time period). The motion detector should provide some assurance by that the azimuth angle change is not due to the physical movement of the inertial system, for example. After observing data over last 30 minutes (or other time period), various conditions should be tested to determine if no motion was detected at 530.

A first condition at 530 includes "No Motion" based on the motion detector comparing inputs to a predetermined threshold. If motion is detected at 530, the method proceeds back to 520 to run the motion detector. If no motion is detected at 520, the method proceeds to 540 where environmental conditions are analyzed. One condition monitored at 540 includes detecting small pitch & roll changes in one second (or other time period) (e.g., <20 μradians). Another environmental condition monitored at 540 can include includes monitoring that temperature changes in last 30 minutes (or other time period has minimal effect. Examples of desirable limits include:

1. Small temperature changes (<1° C.) over last 30 minutes.
2. Small pitch & roll changes in 30 minutes (<20 μradians).

If the above conditions are met at 530 and 540, the a Kalman filter can be executed at 550 (or other filter method) to minimize the heading change from the heading angle from 30 minutes ago (or other predetermined time period). As noted previously, a Kalman measurement noise model which uses $\frac{1}{16}$ milli-radian parameter setting provides suitable results.

FIG. 6 illustrates an example method 600 for detecting motion in an inertial system in accordance with an aspect of the present invention. The method 600 can be executed as part of a motion detector such as previously described with respect to FIG. 1, for example. The method 600 can include receiving inputs at a four-state Kalman filter, for example, that receives at its input a collected sum (e.g., one second's worth of sampled data) of vertical-delta-theta measurements that are received from system gyros.

A function of the method 600 is to detect physical movement in azimuth angle in the last 30 minutes (or other predetermined time period) when the environment can change due to a vehicle moving, wind gusts, animal bumps, or temperature changes, for example. The Kalman filter with four states can include an Integral of azimuth angle, an Azimuth angle, a Vertical earth rate, and Correlated gyro bias, for example. The one second sum of compensated vertical-delta-theta can be used as the input to the filter at 610.

At the end of 30 minutes, for example, at 620 the method 600 via the Kalman filter can estimate the starting values of the four states, which provide the best fit for the 30 minutes (or other time frame) of collected gyro data. At 630, these four states can be used to predict the inertial error of azimuth integral at each of 1800 points (or other sampling interval). At 640, the difference of azimuth integral between this inertial model and the actual data is formed and can yield 1800 residuals (or other range) over the interval. These residuals represent the portion of motion that does not fit an inertial model characteristic.

At 650, the method 600 determines whether or not no motion has been detected. The residual low frequency portion (1800 second period), and referred to as the parameter MD_Sq, is best suited for detection of very slow, small azimuth movement. The sudden movements (e.g., platform movements) are best detected by using the maximum from the residuals, referred to as the parameter Max Res. Detection limits for whether or not "No Motion" is indicated can be defined by the following predetermined threshold examples: (e.g., if all parameter values are less than example thresholds, then no motion flag can be set):

1. Max_Res<0.006 rad-sec
2. MD_Sq<0.002 rad-sec
3. Max Vertical Earth rate<16 deg/hr
4. Max_Correlated Gyro Bias<0.001 deg/hr What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Having described the invention, the following is claimed:

1. A system comprising:
   an inertial system mounted to a static platform comprising:
   a motion detector to receive at least one input corresponding to at least one motion parameter from at least one component of the inertial system over a predetermined time period;
   a Kalman filter to estimate predetermined start values for each of the at least one motion parameter corresponding to a heading without errors at a time preceding the predetermined time period and to generate at least one filtered motion parameter output via the Kalman filter based on the estimated predetermined start values and the at least one input,
   wherein the motion detector determines whether or not motion was detected for the inertial system based upon a comparison of the at least one filtered motion parameter output with at least one predetermined threshold; and
   an azimuth update controller (AUC) that periodically receives the determination of motion detection events from the inertial system and corrects current heading information to the heading without errors in the inertial system in response to receipt of a determination that no motion event has occurred during the predetermined period of time.

2. The system of claim 1, wherein the Kalman filter is a four-input Kalman filter for detecting the motion event in the inertial system.

3. The system of claim 2, wherein the four-input Kalman filter comprises motion parameter inputs that include an integral of azimuth angle, an azimuth angle, a vertical earth rate, and a gyro bias that are received over the predetermined period of time.

4. The system of claim 3, wherein the predetermined period of time is about 30 minutes.

5. The system of claim 1, further comprising a predetermined delay time period to allow stabilization in the inertial system and determine an initial heading estimate corresponding to the heading without errors prior to implementing the AUC.

6. The system of claim 1, the system further comprising a temperature sensor to monitor the temperature over the predetermined time period, wherein the AUC compares temperature changes to a predetermined threshold to determine if heading errors in the inertial system are a result of the temperature changes.

7. The system of claim 1, wherein the AUC further comprises instructions for analyzing pitch and roll changes while processing the at least one motion parameter to determine if heading errors are detected in the inertial system.

8. The system of claim 1, wherein a Kalman noise model in the Kalman filter utilizes a predetermined filter tolerance to generate the at least one filtered motion parameter output to determine if heading errors are detected in the inertial system.

9. A method comprising:
   monitoring at least one component of an inertial system mounted to a static platform to detect at least one motion parameter over a predetermined time period;
   estimating, via a Kalman filter, predetermined start values for each of the at least one motion parameter corresponding to a heading without errors at a time preceding the predetermined time period;
   receiving at least one input from the at least one components of the inertial system corresponding to the at least one motion parameter;

generating at least one filtered motion parameter output via the Kalman filter based on the estimated starting values and the at least one input;

comparing each of the at least one filtered motion parameter output to a corresponding predetermined threshold;

determining that no motion event has occurred for the inertial system during the predetermined time period in response to each filtered motion parameter output satisfying the corresponding predetermined threshold;

processing the at least one motion parameter to determine a current heading;

comparing the current heading to the heading without errors to determine if a heading error is detected in the inertial system; and correcting heading information in the inertial system to information corresponding to the heading without errors in response to the determination that no motion event occurred over the predetermined period and that a heading is detected.

10. The method of claim 9, wherein the Kalman filter is a four-input Kalman filter for detecting motion in the inertial system.

11. The method of claim 10, wherein the four-input Kalman filter comprises four state mechanizations corresponding to an integral of azimuth angle, an azimuth angle, a vertical earth rate, and a gyro bias.

12. The method of claim 11, wherein the predetermined period of time is about 30 minutes.

13. The method of claim 9, further comprising delaying monitoring of the at least one component of an inertial system for another predetermined period of time to allow stabilization in the inertial system.

14. The method of claim 9, further comprising:

analyzing temperature value changes over the predetermined time period;

comparing a predetermined start temperature value with the analyzed temperature values; and determining that correcting heading information will not be performed if the comparison determines that a change in temperature values exceeds a predetermined threshold.

15. The method of claim 9, further comprising analyzing pitch and roll changes while processing the at least one motion parameter to determine if heading errors are detected in the inertial system.

16. The method of claim 9, further comprising applying a Kalman noise model that utilizes a predetermined filter tolerance to generate the at least one filtered motion parameter output to determine if heading errors are detected in the inertial system.

17. A non-transitory computer readable medium storing machine readable instructions configured to:

monitor at least one component of an inertial system mounted to a static platform to detect at least one motion parameter over a predetermined time period;

receive at least one input from the at least one component corresponding to the at least one motion parameter;

compare each motion parameter to a corresponding predetermined threshold;

determine that no motion event has occurred for the inertial system during the predetermined time period in response to each motion parameter satisfying the corresponding predetermined threshold; and correct heading information to information corresponding to a previous heading in the inertial system in response to the determination that no motion event occurred over the predetermined period and that a heading error has been detected.

18. The non-transitory computer readable medium of claim 17, wherein the instructions include executing a four-input Kalman filter to detect motion in the static platform with the inertial system.

19. The non-transitory computer readable medium of claim 18, wherein the executing the four-input Kalman filter to detect motion in an inertial system further comprises analyzing an integral of azimuth angle, an azimuth angle, a vertical earth rate, and a gyro bias over the predetermined period of time.

* * * * *